US 11,296,960 B2

(12) United States Patent
Wang et al.

(10) Patent No.: US 11,296,960 B2
(45) Date of Patent: Apr. 5, 2022

(54) MONITORING DISTRIBUTED APPLICATIONS

(71) Applicant: Nicira, Inc., Palo Alto, CA (US)

(72) Inventors: Bin Wang, San Jose, CA (US);
Margaret Petrus, San Jose, CA (US);
Farzad Ghannadian, Palo Alto, CA (US); Rajiv Krishnamurthy, San Jose, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 15/915,585

(22) Filed: Mar. 8, 2018

(65) Prior Publication Data

US 2019/0280949 A1 Sep. 12, 2019

(51) Int. Cl.
| | |
|---|---|
| *G06F 15/173* | (2006.01) |
| *H04L 43/04* | (2022.01) |
| *H04L 41/22* | (2022.01) |
| *H04L 41/12* | (2022.01) |
| *H04L 41/06* | (2022.01) |

(52) U.S. Cl.
CPC ............ *H04L 43/04* (2013.01); *H04L 41/06* (2013.01); *H04L 41/12* (2013.01); *H04L 41/22* (2013.01)

(58) Field of Classification Search
CPC .......... H04L 41/06; H04L 41/12; H04L 41/22
USPC ........................................................ 709/224
See application file for complete search history.

(56) References Cited

U.S. PATENT DOCUMENTS

| | | |
|---|---|---|
| 5,636,128 A | 6/1997 | Sugimoto et al. |
| 7,027,411 B1 | 4/2006 | Pulsipher et al. |
| 7,065,079 B1 | 6/2006 | Patra et al. |
| 7,739,211 B2 | 6/2010 | Coffman et al. |
| 8,005,945 B2 | 8/2011 | Cohen et al. |
| 8,359,652 B2 | 1/2013 | Bhagwan et al. |
| 8,495,429 B2 | 7/2013 | Fu et al. |
| 8,605,655 B1 | 12/2013 | Sahai et al. |
| 9,215,213 B2 | 12/2015 | Bansal et al. |
| 9,218,527 B2 | 12/2015 | Lakshminarayan et al. |
| 9,223,767 B1 | 12/2015 | Powell et al. |
| 9,438,560 B2 | 9/2016 | Mohanty et al. |
| 9,438,634 B1 | 9/2016 | Ross et al. |
| 9,454,444 B1 * | 9/2016 | Agarwal ............. G06F 11/1425 |
| 9,467,476 B1 | 10/2016 | Shieh et al. |
| 9,497,206 B2 | 11/2016 | Bernstein et al. |
| 9,578,050 B1 | 2/2017 | Barabash et al. |

(Continued)

OTHER PUBLICATIONS

El-Atawy, Adel, et al., "Policy Segmentation for Intelligent Firewall Testing," 1st IEEE ICNP Workshop on Secure Network Protocols, Nov. 6, 2005, 6 pages, IEEE, Boston, MA, USA.

(Continued)

*Primary Examiner* — Hannah S Wang
(74) *Attorney, Agent, or Firm* — Adeli LLP

(57) ABSTRACT

Some embodiments provide a method for monitoring a distributed application. The method receives a request to perform data collection for the distributed application. The method identifies data compute nodes (DCNs) that implement the distributed application. The method sends commands to host machines on which the identified DCNs operate to detect events related to the DCNs and provide data regarding the detected events. The method uses the data regarding the detected events to generate a user interface (UI) display of the topology of the distributed application.

21 Claims, 8 Drawing Sheets

(56) References Cited

U.S. PATENT DOCUMENTS

| | | | |
|---|---|---|---|
| 9,680,877 B2 | 6/2017 | Duffield et al. | |
| 9,699,049 B2 | 7/2017 | Gupta et al. | |
| 9,787,641 B2 | 10/2017 | Bansal et al. | |
| 9,882,713 B1 | 1/2018 | Raza et al. | |
| 9,891,940 B2 | 2/2018 | Feroz et al. | |
| 9,998,339 B1* | 6/2018 | Brajkovic | H04L 41/5058 |
| 10,298,619 B2 | 5/2019 | Nimmagadda et al. | |
| 10,324,746 B2 | 6/2019 | Kumar et al. | |
| 10,419,321 B2 | 9/2019 | Raman et al. | |
| 10,432,707 B2 | 10/2019 | Hosie et al. | |
| 10,812,409 B2 | 10/2020 | Tiwary et al. | |
| 2003/0120955 A1 | 6/2003 | Bartal et al. | |
| 2003/0236677 A1* | 12/2003 | Casati | G06Q 10/0639 |
| | | | 705/7.27 |
| 2004/0190724 A1 | 9/2004 | Dettinger et al. | |
| 2005/0262554 A1 | 11/2005 | Brooks et al. | |
| 2005/0289219 A1 | 12/2005 | Nazzal | |
| 2006/0085785 A1* | 4/2006 | Garrett | G06F 9/5061 |
| | | | 718/1 |
| 2006/0168657 A1 | 7/2006 | Baentsch et al. | |
| 2006/0239203 A1 | 10/2006 | Talpade et al. | |
| 2007/0011734 A1 | 1/2007 | Balakrishnan et al. | |
| 2007/0058632 A1 | 3/2007 | Back et al. | |
| 2008/0037423 A1 | 2/2008 | Singh et al. | |
| 2008/0059596 A1 | 3/2008 | Ogawa | |
| 2008/0196102 A1 | 8/2008 | Roesch | |
| 2008/0196103 A1 | 8/2008 | Lin et al. | |
| 2008/0267186 A1 | 10/2008 | Boukis et al. | |
| 2008/0281660 A1 | 11/2008 | Sajja et al. | |
| 2008/0282335 A1 | 11/2008 | Abzarian et al. | |
| 2009/0106228 A1* | 4/2009 | Weinman, Jr. | G06Q 30/02 |
| 2009/0300341 A1 | 12/2009 | Buehler et al. | |
| 2010/0049968 A1* | 2/2010 | Dimitrakos | H04L 63/0807 |
| | | | 713/153 |
| 2010/0106764 A1 | 4/2010 | Chadwick et al. | |
| 2010/0107085 A1 | 4/2010 | Chadwick et al. | |
| 2010/0153316 A1 | 6/2010 | Duffield et al. | |
| 2010/0211673 A1 | 8/2010 | Kosbab et al. | |
| 2010/0309812 A1* | 12/2010 | Galan Marquez | H04L 41/0856 |
| | | | 370/254 |
| 2010/0325199 A1 | 12/2010 | Park et al. | |
| 2010/0332262 A1 | 12/2010 | Horvitz et al. | |
| 2011/0082962 A1* | 4/2011 | Horovitz | G06F 11/301 |
| | | | 711/6 |
| 2011/0170413 A1 | 7/2011 | Shi et al. | |
| 2012/0131591 A1 | 5/2012 | Moorthi et al. | |
| 2012/0226808 A1 | 9/2012 | Morgan | |
| 2012/0266231 A1 | 10/2012 | Spiers et al. | |
| 2013/0041522 A1 | 2/2013 | Mori et al. | |
| 2013/0067090 A1 | 3/2013 | Batrouni et al. | |
| 2013/0124753 A1 | 5/2013 | Ansari et al. | |
| 2013/0185413 A1 | 7/2013 | Beaty et al. | |
| 2013/0198459 A1 | 8/2013 | Joshi et al. | |
| 2013/0212255 A1* | 8/2013 | Chao | H04L 41/083 |
| | | | 709/224 |
| 2013/0297768 A1 | 11/2013 | Singh | |
| 2014/0019964 A1 | 1/2014 | Neuse et al. | |
| 2014/0207918 A1 | 7/2014 | Kowalski et al. | |
| 2014/0230008 A1 | 8/2014 | Feroz et al. | |
| 2014/0245423 A1 | 8/2014 | Lee | |
| 2014/0282591 A1 | 9/2014 | Stich et al. | |
| 2014/0310513 A1 | 10/2014 | Barney et al. | |
| 2015/0113529 A1* | 4/2015 | Zhong | G06F 9/5033 |
| | | | 718/1 |
| 2015/0124608 A1 | 5/2015 | Agarwal et al. | |
| 2015/0135003 A1 | 5/2015 | Cota-Robles et al. | |
| 2015/0181394 A1 | 6/2015 | Zuniga et al. | |
| 2015/0281056 A1 | 10/2015 | Liljenstolpe | |
| 2015/0281065 A1 | 10/2015 | Liljenstolpe | |
| 2015/0286783 A1 | 10/2015 | Kumar et al. | |
| 2015/0304349 A1 | 10/2015 | Bernstein et al. | |
| 2015/0358391 A1 | 12/2015 | Moon et al. | |
| 2016/0050589 A1* | 2/2016 | Safavi | H04W 36/0033 |
| | | | 455/436 |
| 2016/0080404 A1 | 3/2016 | Kohout et al. | |
| 2016/0087847 A1 | 3/2016 | Krithivas et al. | |
| 2016/0087859 A1 | 3/2016 | Kuan et al. | |
| 2016/0156591 A1 | 6/2016 | Zhou et al. | |
| 2016/0191413 A1 | 6/2016 | Feroz et al. | |
| 2016/0191463 A1 | 6/2016 | Mohanty et al. | |
| 2016/0191521 A1 | 6/2016 | Feroz et al. | |
| 2016/0216994 A1 | 7/2016 | Sefidcon et al. | |
| 2016/0218951 A1 | 7/2016 | Vasseur et al. | |
| 2016/0294987 A1 | 10/2016 | Tian et al. | |
| 2016/0301603 A1 | 10/2016 | Park et al. | |
| 2016/0350683 A1 | 12/2016 | Bester et al. | |
| 2016/0359759 A1 | 12/2016 | Singh et al. | |
| 2016/0380812 A1* | 12/2016 | Chanda | H04L 41/0803 |
| | | | 709/220 |
| 2016/0380884 A1 | 12/2016 | Sarikaya et al. | |
| 2017/0005986 A1 | 1/2017 | Bansal et al. | |
| 2017/0078168 A1 | 3/2017 | Harris et al. | |
| 2017/0126677 A1 | 5/2017 | Kumar et al. | |
| 2017/0134247 A1* | 5/2017 | Hoja | H04L 43/04 |
| 2017/0207968 A1 | 7/2017 | Eicken et al. | |
| 2017/0212799 A1* | 7/2017 | Konireddygari | G06F 11/0781 |
| 2017/0214634 A1* | 7/2017 | Li | G06F 9/5077 |
| 2017/0293994 A1 | 10/2017 | Li et al. | |
| 2017/0324632 A1 | 11/2017 | Arora | |
| 2017/0359217 A1 | 12/2017 | Ahuja et al. | |
| 2017/0374102 A1 | 12/2017 | Woolward | |
| 2017/0374106 A1 | 12/2017 | Hamou et al. | |
| 2018/0007127 A1 | 1/2018 | Salapura et al. | |
| 2018/0027080 A1 | 1/2018 | Yang et al. | |
| 2018/0032399 A1 | 2/2018 | Johnson et al. | |
| 2018/0034856 A1 | 2/2018 | Mallya | |
| 2018/0041578 A1 | 2/2018 | Lee et al. | |
| 2018/0048623 A1 | 2/2018 | Bansal et al. | |
| 2018/0077119 A1 | 3/2018 | Fields et al. | |
| 2018/0077189 A1 | 3/2018 | Doppke et al. | |
| 2018/0084034 A1 | 3/2018 | Netto et al. | |
| 2018/0088964 A1 | 3/2018 | Hussain et al. | |
| 2018/0101371 A1 | 4/2018 | Flanakin et al. | |
| 2018/0123907 A1 | 5/2018 | Raman et al. | |
| 2018/0123939 A1 | 5/2018 | Raman et al. | |
| 2018/0145999 A1 | 5/2018 | Ertugrul et al. | |
| 2018/0167405 A1 | 6/2018 | Comay et al. | |
| 2018/0176102 A1 | 6/2018 | Bansal et al. | |
| 2018/0176252 A1 | 6/2018 | Nimmagadda et al. | |
| 2018/0176261 A1 | 6/2018 | Bansal et al. | |
| 2018/0287876 A1* | 10/2018 | Strobel | H04L 41/12 |
| 2018/0288063 A1 | 10/2018 | Koottayi et al. | |
| 2018/0324199 A1 | 11/2018 | Crotinger et al. | |
| 2019/0166008 A1 | 5/2019 | Gintis et al. | |
| 2019/0171474 A1 | 6/2019 | Malboubi et al. | |
| 2019/0180141 A1 | 6/2019 | Tiagi et al. | |
| 2019/0182276 A1 | 6/2019 | Tiagi et al. | |
| 2019/0182281 A1 | 6/2019 | Neil et al. | |
| 2019/0199599 A1* | 6/2019 | Zavesky | H04L 41/16 |
| 2019/0266004 A1 | 8/2019 | Kumar et al. | |
| 2019/0342335 A1 | 11/2019 | Ni et al. | |
| 2019/0373052 A1 | 12/2019 | Pollitt et al. | |
| 2019/0379612 A1 | 12/2019 | Tiwary et al. | |
| 2020/0028756 A1 | 1/2020 | Hale et al. | |
| 2020/0183947 A1 | 6/2020 | Reeve et al. | |
| 2020/0310884 A1 | 10/2020 | Villalobos et al. | |

OTHER PUBLICATIONS

Turcotte, Melissa J. M., et al., "Unified Host and Network Data Set", Aug. 24, 2017, 16 pages, arXiv:1708.07518v1, arXiv.org, Cornell University, Ithaca, NY, USA.

Waye, Lucas, et al., "Cryptographically Secure Information Flow Control on Key-Value Stores," CCS '17: Proceedings of the 2017 ACM SIGSAC Conference on Computer and Communications Security, Oct. 30-Nov. 3, 2017, 15 pages, ACM, Dallas, TX, USA.

* cited by examiner

MONITORING DISTRIBUTED APPLICATIONS

BACKGROUND

When an application operating on a single machine is not operating correctly, diagnosing and correcting the issue is typically not too difficult. However, many applications (especially web applications) are distributed applications spread across multiple VMs in a datacenter (or in multiple datacenters). For instance, a typical multi-tier application will have a set of web servers, a set of application servers, and a set of database servers, each being a separate VM. In this case, if the application is not operating correctly, it can be difficult to determine the root cause of the problem, which could be caused by application code issues, processes being down, a VM being powered off, a networking issue preventing one or more of the VMs from being able to connect to the other VMs, etc.

BRIEF SUMMARY

Some embodiments provide a novel system for monitoring and troubleshooting a distributed application. The system of some embodiments includes data collection agents operating on host machines that host data compute nodes (DCNs) implementing the distributed application, a data collection appliance that receives event data collected by the data collection agents and interfaces with a client to provide data regarding the distributed application to the client, and a network manager agent that identifies host machines on which the distributed application is implemented and commands the data collection agents on those host machines to start and stop collecting event data from the DCNs. In some embodiments, the appliance uses the event data from the data collection agents, as well as logical network topology data from the network manager agent, to map different processes of the distributed application (e.g., web servers, application servers, and database servers) to the logical network topology, and present this data to the client.

Specifically, in some embodiments the appliance receives a request to perform data collection for a distributed application (e.g., from a user interface running on a client device operated by an administrator of the distributed application). For instance, if the distributed application is not operating correctly, the administrator might initiate the request for troubleshooting purposes.

In response to such a request, the data collection system identifies the DCNs (e.g., virtual machines, containers, etc.) that implement the distributed application as well as the host machines on which these DCNs operate. In some embodiments, the data collection appliance identifies various DCN groups associated with the distributed application (e.g., identifiers for a web server group, an application server group, and a database server group, for a traditional 3-tier application). The data collection appliance specifies to the network manager agent (e.g., an agent operating within a network manager that is responsible for generating network configuration data for the host machines) to start data collection for these DCN groups. The network manager agent identifies the DCNs in the groups and uses the network topology information of the network manager to determine the hosts on which the DCNs operate.

The network manager agent, in some embodiments, sends commands to the data collection agents on the host machines to collect event data for the particular DCNs. The host machines may host DCNs for numerous different logical networks, but the data collection agents of some embodiments only collect event data for the DCNs specified by commands from the network manager agent. In addition to specifying the DCNs for which event data should be collected, the commands from the network manager agent in some embodiments identify the data collection appliance as the destination for reporting event data, as well as how often to report data and how long the data collection should last.

The data collection agents execute in the virtualization software of their respective host machines in some embodiments. In some embodiments, these agents communicate with guest introspection agents executing in the DCNs to collect event data. The event data, in some embodiments, includes network events and processes starting and stopping in the DCN. Network events can include, for example, inbound and outbound transport layer (e.g., TCP) connection and disconnection requests, or an application starting and stopping listening on a socket. In some embodiments, the network events specify the process in the DCN that is involved in the transport layer connection. According to the commands from the network manager agent, the data collection agents regularly provide network event data to the data collection appliance for the specified duration, which the data collection appliance uses to provide information about the distributed application to the client.

Based on the event data received from the data collection agents, the data collection appliance of some embodiments identifies connections between the different processes of the distributed application, as well as incoming connections from external sources (e.g., external clients connecting to the web servers). Connections between different processes may be identified by correlating corresponding network events from different DCNs (e.g., a web server initiating a connection with an application server) using timestamps on the event data. Latency data can also be calculated using these timestamps.

In addition to receiving the event data from the data collection agents, the data collection appliance also receives logical network topology information from the network manager agent in some embodiments. The network topology data specifies, e.g., the logical switch ports to which the various DCNs that implement the distributed application connect, as well as the rest of the logical network topology (e.g., the connection of these logical switches to logical routers, the logical router connections to external networks, firewall configurations for the logical forwarding elements, etc.

Using the connection data and the network topology data, the data collection appliance of some embodiments maps the different distributed application processes to the logical network topology. In some embodiments, the appliance uses this mapping to generate a graph of the connections between the application processes and provides this graph to the user. This graph, for example, illustrates connections between the various different web servers, app servers, database servers, etc. of the distributed application, and may include the number of transport connections over a particular period of time as well as latency or other derived data about the connections. The admin can use this information to identify any problems with the application (e.g., if one of the processes is down, its connectivity is down, etc.).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel system for monitoring and troubleshooting a distributed application. The system of some embodiments includes data collection agents operating on host machines that host data compute nodes (DCNs) implementing the distributed application, a data collection appliance that receives event data collected by the data collection agents and interfaces with a client to provide data regarding the distributed application to the client, and a network manager agent that identifies host machines on which the distributed application is implemented and commands the data collection agents on those host machines to start and stop collecting event data from the DCNs. In some embodiments, the appliance uses the event data from the data collection agents, as well as logical network topology data from the network manager agent, to map different processes of the distributed application (e.g., web servers, application servers, and database servers) to the logical network topology, and present this data to the client.

Figure 1:
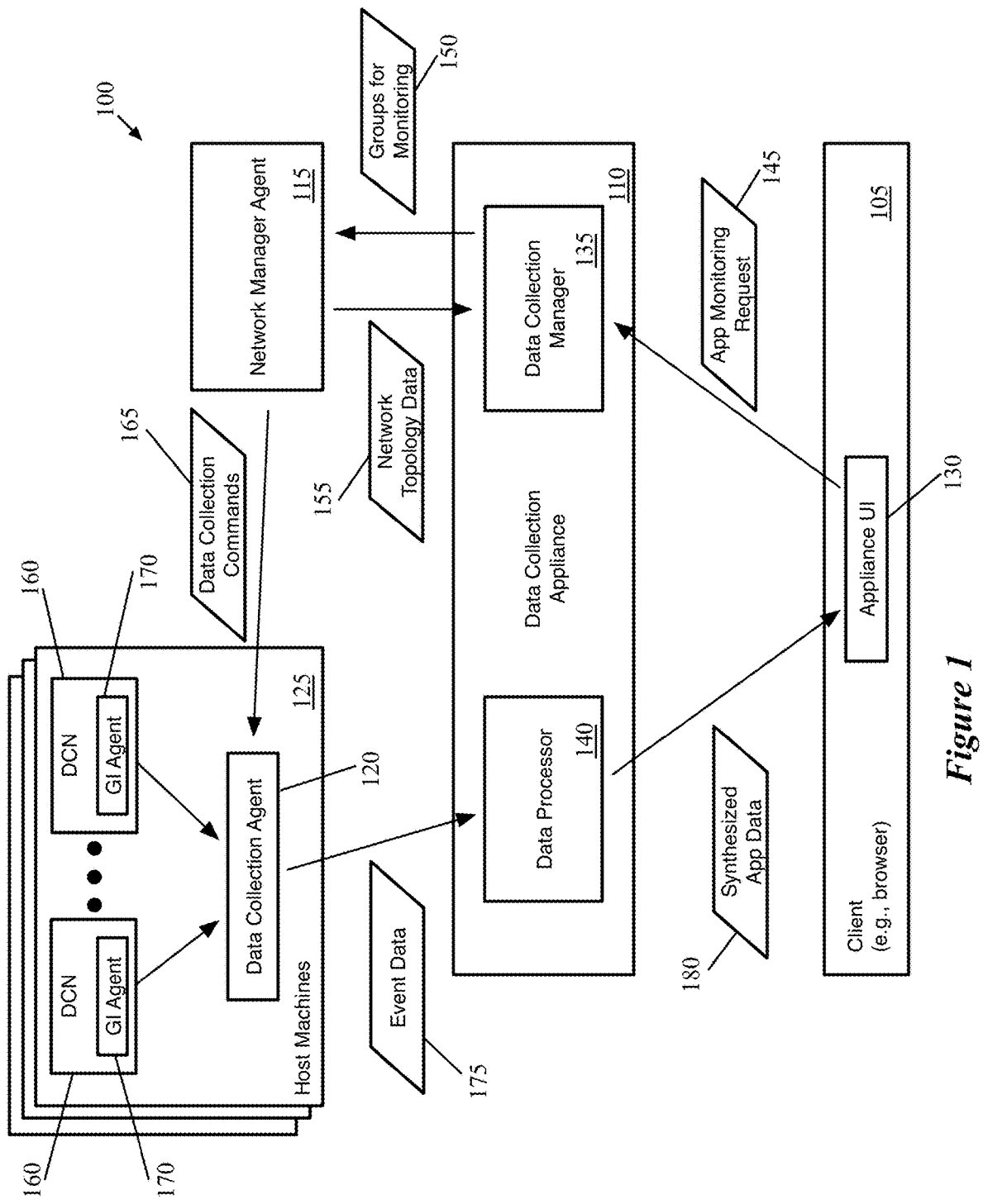
FIG. 1 conceptually illustrates a system of some embodiments for monitoring and troubleshooting a distributed application.

FIG. 1 conceptually illustrates such a system 100 of some embodiments for monitoring and troubleshooting a distributed application. As shown, the system 100 includes a client 105, a data collection appliance 110, a network manager agent 115, and data collection agents 120 that execute on host machines 125. The client 105 of some embodiments is a browser, mobile application, or other application that allows a user (e.g., an administrator of a distributed application) to communicate with the data collection appliance from a desktop computer, laptop computer, mobile device such as a smartphone or tablet, etc. As shown, a user interface (UI) 130 for the appliance is displayed within the client. In some embodiments, the UI 130 is displayed by the client according to data (e.g., http or https data) provided by the data collection appliance. In some embodiments, the system 100 provides application monitoring for numerous distributed applications of numerous different datacenter tenants, and thus numerous clients may connect to the data collection appliance 110 to receive UIs for monitoring their respective distributed applications.

In some embodiments, the data collection appliance 110 and the network manager agent 115 operate within such a datacenter (e.g., within the network control system of such a datacenter). These modules may operate within separate network controller/manager machines (e.g., servers) or on host machines in different embodiments. The network manager agent 115 and data collection appliance 110 operate on the same machine in some embodiments, while in other embodiments these modules operate on different machines. In some embodiments, one data collection appliance 110 provides instructions to (and receives data from) multiple network manager agents 115 operating in multiple different network managers.

The data collection appliance 110 includes a data collection manager 135 and a data processor 140. As described further below, the data processor 140 is responsible for processing data collected by the data collection agents 120 on the host machines 125. The data collection manager 135 of some embodiments receives an application monitoring request 145 from the client 105 (e.g., via user interaction through the appliance UI 130). For example, if a particular distributed application is not operating correctly when accessed through the internet, the administrator might initiate the application monitoring request 145.

The data collection manager 135 of some embodiments is responsible for communicating with the network manager agent 115 to provide data collection request information to the network manager agent 115 and receive network topology data from the network manager agent. In some embodiments, upon receiving the request 145 from the client 105, the data collection manager identifies one or more DCN groups associated with the distributed application. For instance, in some embodiments, the distributed application is a multi-tier application with sets of one or more web servers, application servers, and database servers. In some embodiments, the data collection manager 135 determines the DCN groups for the distributed application and provides identifiers 150 for these groups to the network manager agent 115.

The network manager agent 115 operates as part of a network manager in some embodiments. The network manager (not shown separately in the figure) is responsible for generating logical network configuration data for managed forwarding elements that operate on the host machines. The host machines, in one or more datacenters, host DCNs (e.g., virtual machines) for one or more tenants that are connected to each other and to external networks according to logical networks. These logical networks are network abstractions configured by an administrator that allow DCNs spread across hosts in one or more datacenters to operate as though on an isolated network of their own while sharing the physical infrastructure with other DCNs of other logical networks. Managed forwarding elements that operate on the host machines (e.g., in the virtualization software of the host machines) implement these logical networks by processing packets according to one or more logical forwarding elements (e.g., logical switches, logical routers) of the appropriate logical network.

In some embodiments, the network manager agent 115 receives the group identifiers 150 and identifies the DCNs that belong to these groups, as well as the host machines on which these DCNs operate. In some embodiments, the network manager agent 115 queries the network manager database(s) to first determine the DCNs for each group identifier and then determine the host for each of these DCNs.

Based on this data, the network manager agent 115 sends commands 165 to the data collection agents 120 on the identified host machines 125 to collect event data for the identified DCNs. The host machines 125 may host DCNs 160 for numerous different logical networks, but the data collection agents 120 of some embodiments only collect event data for the DCNs specified by commands from the network manager agent 115. In addition to specifying the DCNs for which event data should be collected, the commands from the network manager agent 115 in some embodiments identify the data collection appliance (or specifically the data processor 140) as the destination for reporting event data, as well as how often to report data and how long the data collection should last.

The data collection agents 120 execute in the virtualization software of their respective host machines 125 in some embodiments. In some embodiments, these agents communicate with guest introspection agents 170 executing in the DCNs to collect event data. The event data, in some embodiments, includes network events and processes starting and stopping in the DCN. Network events can include, for example, inbound and outbound transport layer (e.g., TCP) connection and disconnection requests, or an application starting and stopping listening on a socket. In some embodiments, the network events specify the process in the DCN that is involved in the transport layer connection. According to the commands from the network manager agent 115, the data collection agents 120 regularly provide network event data 175 to the data processor 140 for the specified duration, which the data processor uses to provide information about the distributed application to the client 105.

Based on the event data received from the data collection agents 140, the data processor 140 of some embodiments identifies connections between the different processes of the distributed application, as well as incoming connections from external sources (e.g., external clients connecting to the web servers). Connections between different processes may be identified by correlating corresponding network events from different DCNs (e.g., a web server initiating a connection with an application server) using timestamps on the event data. Latency data between the various DCNs can also be calculated using these timestamps.

In addition, the network manager agent 115 determines the logical network topology for the distributed application in some embodiments. For example, the DCNs in each of the DCN groups might attach to a different logical switch, which may be connected to each other via one or more logical routers, and which connect to the external network through one or more gateways. In some embodiments, the network manager agent 115 queries the network manager database for this information and provides the logical network topology data 155 to the data collection appliance 110 (e.g., via its communication channel with the data collection manager 135).

Using the connection data (generated based on the event data 175) and the network topology data 155, the data processor 140 of some embodiments maps the different distributed application processes to the logical network topology. In some embodiments, the data processor 140 uses this mapping to generate a graph of the connections between the application processes and provides this graph and/or other synthesized data 180 about the distributed application) to the client 105 (e.g., for display in the UI 130). This graph, for example, illustrates connections between the various different web servers, app servers, database servers, etc. of the distributed application, and may include the number of transport connections over a particular period of time as well as latency or other derived data about the connections. The admin can use this information to identify any problems with the application (e.g., if one of the processes is down, its connectivity is down, etc.).

Figure 2:
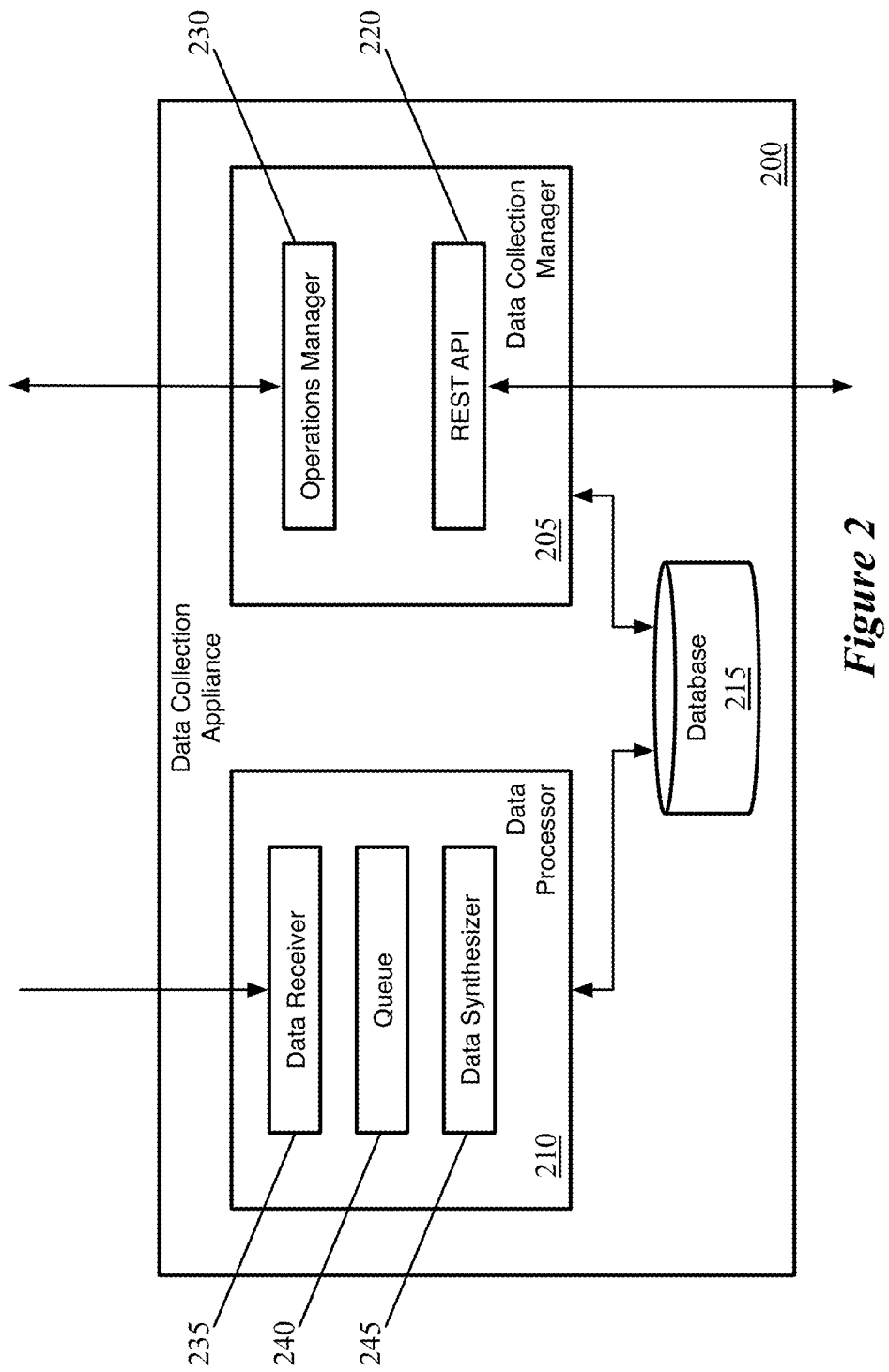
FIG. 2 conceptually illustrates the architecture of a data collection appliance of some embodiments.

With the system 100 described, the subsequent sections describe some of the components of this system (e.g., the data collection appliance, the network manager agent, and the data collection agents) in greater detail. FIG. 2 conceptually illustrates the architecture of a data collection appliance 200 of some embodiments. In some embodiments, the data collection appliance 200 is part of a network management and configuration system through which an administrator provides configuration information for logical networks and is able to view the network configuration (e.g., the logical forwarding element configuration, firewall rules, etc.).

As shown, the data collection appliance 200 includes a data collection manager 205 and a data processor 210, as well as one or more databases 215. The data collection manager 205 of some embodiments includes a set of APIs 220 and an operations manager 230, and is responsible for communicating with clients through its user interface and providing data collection and monitoring instructions to the network manager agent (as well as receiving network topology data from the network manager agent). Though part of the data collection appliance 200 with the data processor 210 in this illustration, in other embodiments the data collection manager 205 is separate from the data processor 210 (e.g., a separate application that could run on a different server). The data processor 210 of some embodiments includes a data receiver 235, a queue 240, and a data synthesizer 245, and is responsible for receiving event data from the data collection agents and generating the synthesized application data to be provided to the requesting clients.

Figure 3:
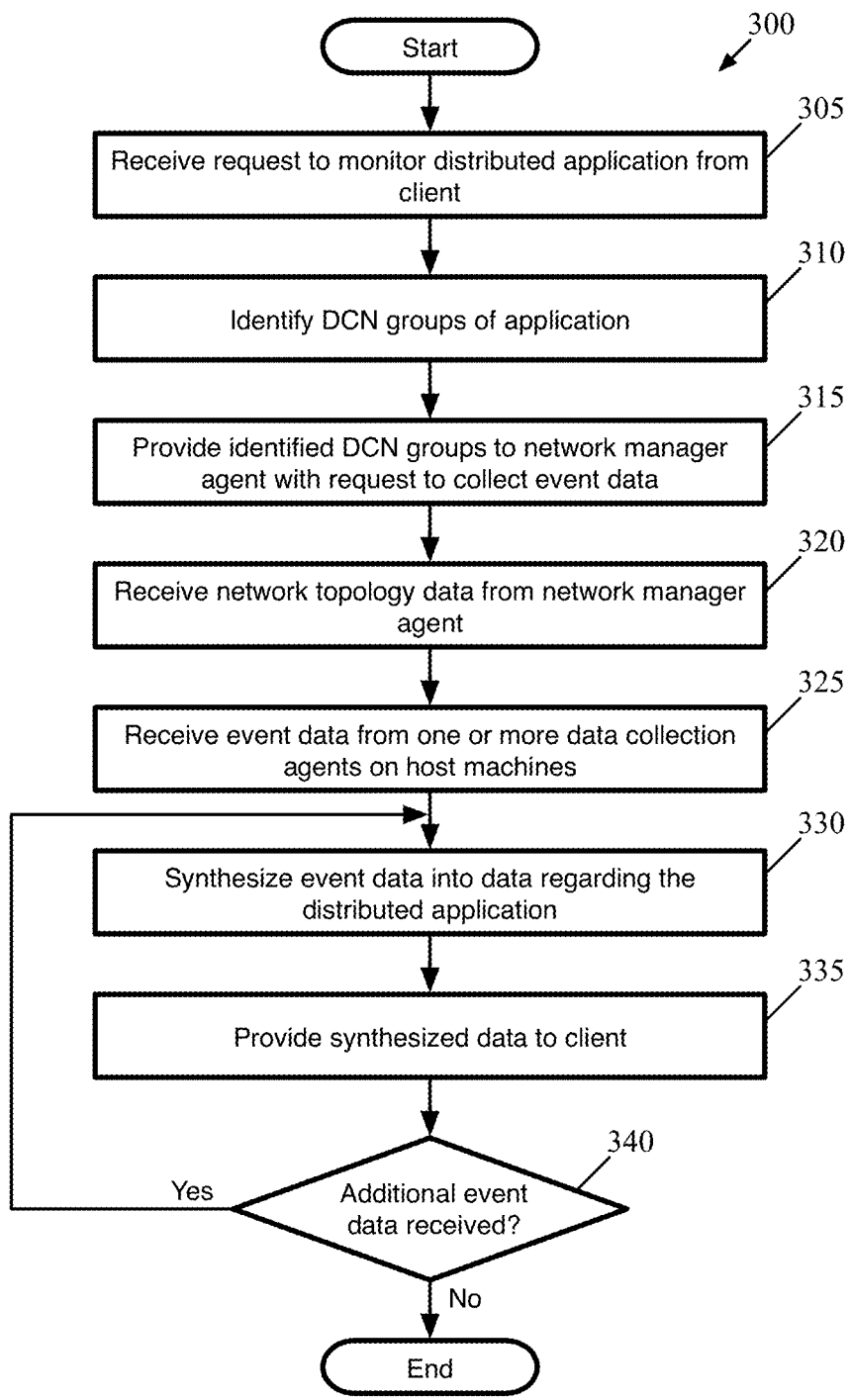
FIG. 3 conceptually illustrates a process of some embodiments for initiating a data collection request for a distributed application and providing data about that application to a requesting client based on the collected event data.

The operations of the data collection appliance 200 will be described in more detail by reference to FIG. 3, which conceptually illustrates a process 300 of some embodiments for initiating a data collection request for a distributed application and providing data about that application to a requesting client based on the collected event data. The process 300 is performed by the data collection appliance in some embodiments.

As shown, the process 300 begins by receiving (at 305) a request from a client to monitor a distributed application. In some embodiments, the data collection manager 205 provides a set of Representational State Transfer (REST) APIs 220, which a client uses to send such a request to the data collection appliance 200. These APIs include, in some embodiments, an API for initiating the request to monitor a distributed application (or other domain of DCNs) as well as an API for requesting application topology data determined through the data collection process. In some embodiments, the request from the user specifies a distributed application that the user has previously configured to operate in a datacenter (or multiple datacenters), such as a multi-tier application. In addition, these APIs 220 are also used to perform other monitoring and/or network configuration functions.

Next, the process 300 identifies (at 310) the DCN groups associated with the distributed application. In some embodiments, the operations manager 230 or another module in the data collection appliance identifies the DCN groups associated with the applications received through the data collection request API. For instance, a traditional three-tier application could have a web server group, an application server group, and a database server group. In some embodiments, each of these groups is associated with a group identifier, which is used to tag the associated DCNs in the network configuration data (e.g., stored by the network manager).

The process 300 then provides (at 315) the identified DCN groups to the network manager agent with a request to collect event data for the DCNs in those groups. In some embodiments, the operations manager 230 communicates with the network manager agent to provide the DCN group identifiers for data collection to the network manager agent.

The process 300 also receives (at 320) network topology data from the network manager agent. In some embodiments, the operations manager 230, in addition to providing the network manager agent with the data collection request, is also responsible for tracking the active data collection sessions (and providing this information if requested) and for querying the network manager agent for logical network topology information for the distributed application. In different embodiments, the query for application topology information is part of the data collection request or can be a separate transaction with the network manager agent. In some such embodiments, the operations manager 230 can provide the data collection request without requiring the logical network topology or can request the logical network topology at a later time (e.g., in response to a request from a client for the topology of the distributed application).

Once the data collection agents on the host machines have begun data collection, they report any detected events and thus the process 300 receives (at 325) event data from one or more data collection agents on the host machines. The data receiver 235 of some embodiments receives this event data (e.g., through a remote procedure call (RPC) channel) and stores the event data in a queue. In some embodiments, the data collection agents provide data for various types of network events, which may include (i) a process (acting as a client) issuing an outbound connection request (to a server), (ii) a process issuing a disconnection request, (iii) a process (as a server) receiving an incoming connection request from a client, (iv) a process initiating a disconnect of an existing connection, (v) a process (acting as a server) starting to listen on a socket, and (vi) a process (acting as a server) stopping listening on a socket.

In some embodiments, each piece of network event data from the data collection agents indicating a network event includes the type of network event, source and destination IP addresses, source and/or destination transport layer ports, a transport layer protocol (e.g., TCP or UDP), identifiers indicating the process that either initiated or received the indicated network event and the DCN on which the process executes. This network event data may be sent as individual messages for each event or as a group of network events that are sent to the data processor 210 at regular intervals by each data collection agent.

When data is received, the process 300 synthesizes (at 330) the event data into data regarding the distributed application. The data synthesizer 245 may perform various different operations in different embodiments to synthesize the event data read from the data queue 240. First, some embodiments determine which components are operational or not operational (e.g., based on whether any processes are not running). In addition, some embodiments correlate DCNs to application components (e.g., web server, app server, database server, etc.) based on the processes operating on those DCNs.

The data synthesizer 245 also correlates network events from two different ends of a connection. For example, when an application server initiates a connection with a database server, some embodiments receive network events corresponding to both processes (i.e., an event for an outbound connection at the "client" process followed by an event for an inbound connection at the "server" process). Based on the timestamps on these two events, the data synthesizer can identify that the two events relate to the same connection. This data can also be used to track latency between the two processes, for both connection requests and for subsequent higher-layer data messages (e.g., HTTP messages).

Figure 7:
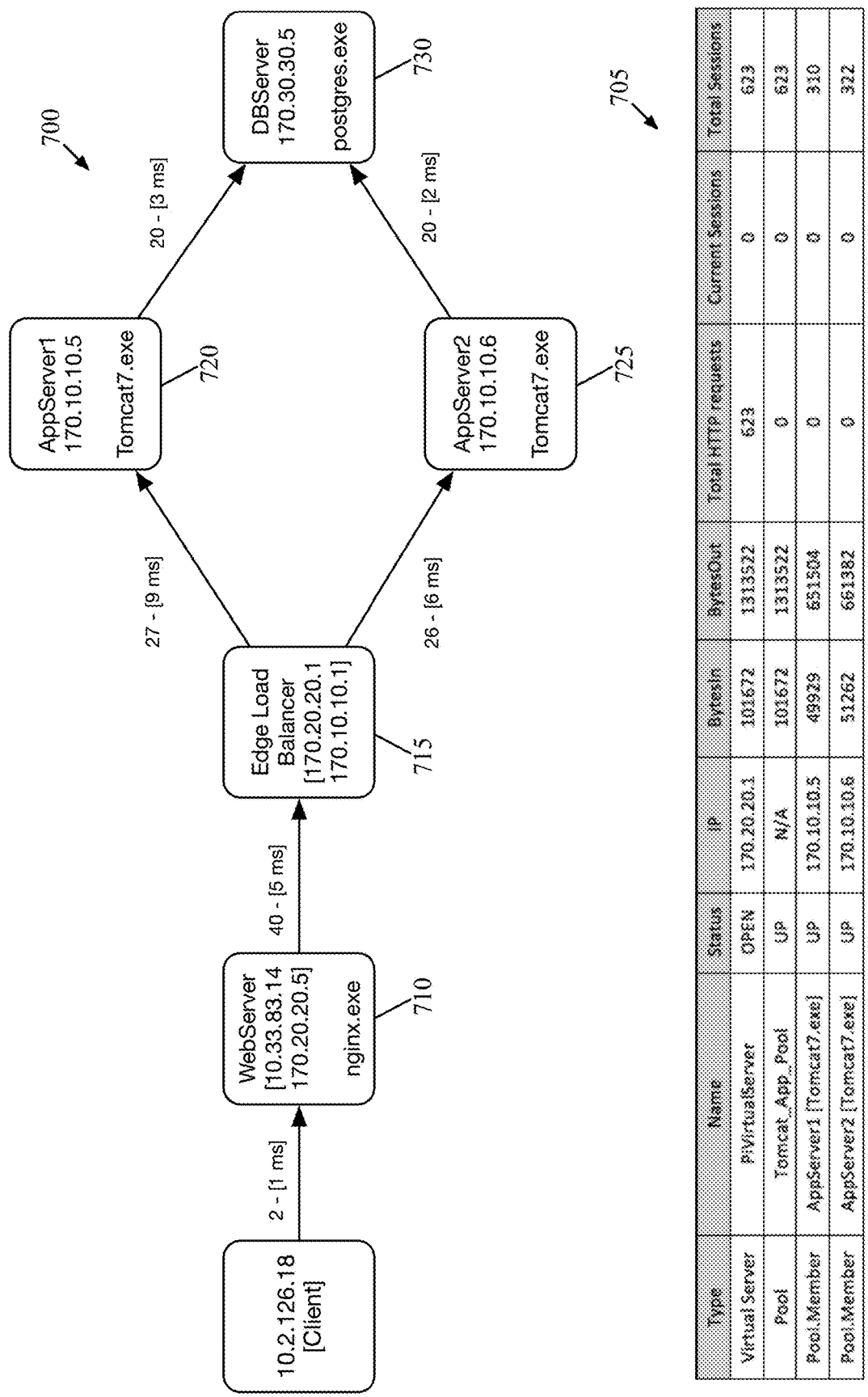
FIG. 7 illustrates an application topology graph along with an application statistics table.

With the correlated data, the data synthesizer 245 generates an application topology graph in some embodiments. The application topology graph of some embodiments is illustrated in FIG. 7, which is described in further detail below. In some embodiments, this graph also includes the logical network topology data received from the network manager agent, which may be stored in the set of databases 215. The application topology graph shows the various processes (e.g., organized by tiers of the distributed application) with indications of the connections between these processes. The graph may also indicate logical network data, such as the logical switch ports to which the DCNs connect, any logical router gateways through which incoming connections (from external clients) are received, etc.

The process 300 then provides (at 335) the synthesized data to the requesting client, for the client to display in its user interface. In some embodiments, as described in more detail below by reference to FIG. 7, the data collection appliance provides the distributed application topology graph indicating connections between processes, latency between these connections, any processes that are down, etc. In some embodiments, statistics may also be displayed in other forms based on the received event data. To provide this data to the client, in some embodiments the data processor 210 stores the synthesized data in the set of databases 215, allowing the data collection manager 205 to retrieve the data and use the data to respond to a client request.

After providing the synthesized data, the process 300 determines (at 340) whether additional event data has been received. If additional data has been received, the process returns to 330 to continue synthesizing the data (and, if needed, providing the synthesized data to the client). In some embodiments, the application topology graph is regularly updated with the number of connections detected between the various application components, any notifications regarding processes that have gone down, etc. It should be understood that the process 300 is a conceptual process, and that the actual operation of the data collection appliance 200 will not necessarily be linear (even with respect to a single data collection request). For instance, some embodiments only receive the network topology data from the network manager agent if this data is requested, and thus this operation may appear anywhere in the order. Furthermore, the data synthesis operations of some embodiments are event-driven and occur any time event data is stored in the queue 240 by the data receiver 235. Once the time duration for monitoring has expired and the last event data is processed, the process ends, as additional data will no longer be sent to the data processor 210.

Figure 4:
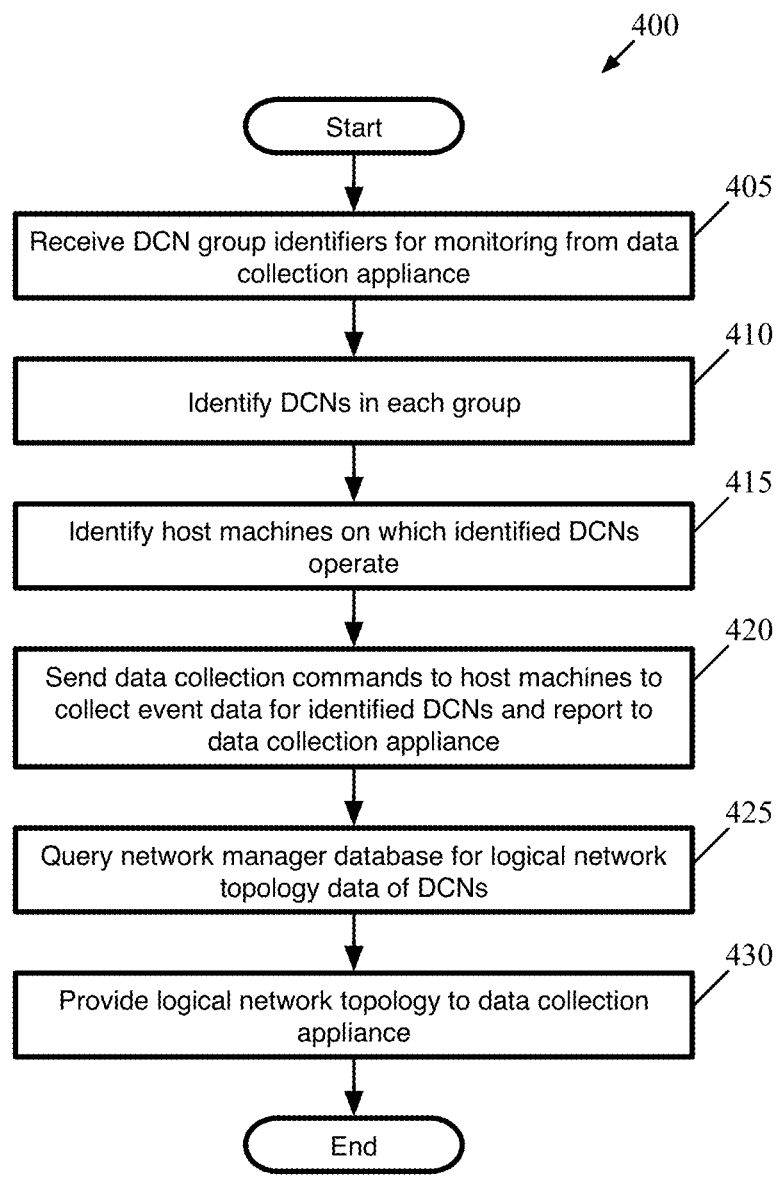
FIG. 4 conceptually illustrates a process performed by the network manager agent of some embodiments.

FIG. 4 conceptually illustrates a process 400 performed by the network manager agent of some embodiments (e.g., the network manager agent 115 of FIG. 1). In some embodiments, the network manager agent operates within a network manager that is responsible for generating logical network configuration data for managed forwarding elements that operate on the host machines.

As shown, the process 400 begins (at 405) by receiving DCN group identifiers for monitoring from a data collection appliance. As described above, these group identifiers do not identify specific DCNs in some embodiments, but rather identifiers that may be stored as tags for DCNs within the network manager database(s). For instance, if an application is setup as a three-tier application, the data collection appliance may provide a web server group identifier, an application server group identifier, and a database server group identifier. Depending on whether the data collection appliance and the network manager agent operate on the same machine, the DCN group identifiers could be received by inter-process communication or by some other mechanism.

Next, the process 400 identifies (at 410) the DCNs in each group. As mentioned, the group identifiers are used as tags on DCN information in the network configuration database(s) stored by the network manager in some embodiments, and thus the network manager agent can run a query for these tags in order to determine the DCNs that correspond to each of the identified groups.

The process 400 then identifies (at 415) the host machines on which the DCNs operate. The network configuration database(s) additionally store the current physical host machine on which each of the DCNs operates, in some embodiments, and thus the network manager agent queries this data to determine the host machines. The DCNs may all operate on different host machines or may have some overlap (i.e., two or more of the DCNs operating on the same host machine), depending on the setup.

With the host machines identified, the process 400 sends (at 420) data collection commands to the data collection agents on each of the host machines to collect event data for the identified DCNs and report the event data to the data collection appliance. In some embodiments, each of these messages includes (i) an identification of the one or more DCNs on the host to monitor, (ii) a duration for the data collection session, (iii) a frequency with which to report event data to the data collection, and (iv) a session identifier that is used when reporting data to the data collection appliance. The network manager agent identifies the data collection appliance as the destination for the events either in this message or in an earlier provisioning message for configuring the data collection agent. To send these messages, some embodiments use a channel (e.g., an RMQ channel) between the network manager and a local control agent on the host machine that is used for network configuration.

In addition, in some cases, the network manager agent queries (at 425) the network manager database for the topology of the logical network(s) to which the DCNs connect and provides (at 430) the logical network topology to the data collection appliance. The process then ends. As mentioned above, in some embodiments the network manager agent automatically performs these queries for any group of DCNs being monitored, while in other embodiments the network manager agent only performs the queries in response to a specific request. In some embodiments, the network manager agent starts with the DCN identifiers and determines the logical switches to which these DCNs logically connect. In some such embodiments, the network manager agent identifies the virtual network interfaces of the DCNs (which may each have one or more such interfaces), determines the logical ports to which these interfaces connect, and then determines the logical switches that include the logical port. In addition, some embodiments identify the logical routers to which any of these logical switches connect, as well as any gateways that implement the centralized components of the logical routers (for providing stateful services and/or handling traffic between the logical network and external networks.

Figure 5:
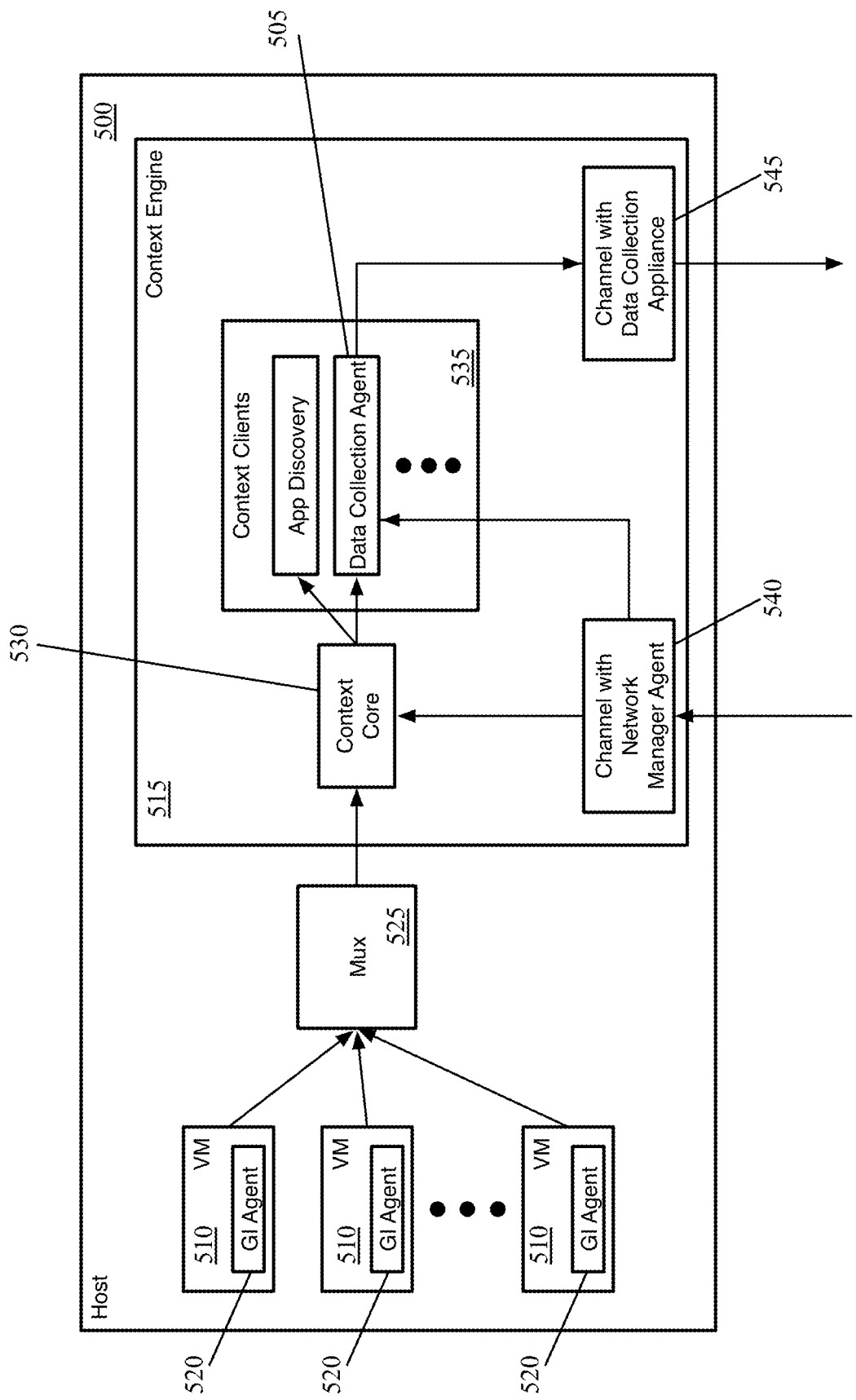
FIG. 5 conceptually illustrates the architecture of a host machine that includes a data collection agent of some embodiments.

FIG. 5 conceptually illustrates the architecture of a host machine 500 that includes a data collection agent 505 of some embodiments. As shown, the host machine 500 includes multiple virtual machines (VMs) 510 and a context engine 515. Operating on each of the VMs 510 is a guest introspection agent 520 that handles various security features for the VM in some embodiments. As part of the security operations, the guest introspection agents 520 of some embodiments identify incoming and outgoing network connections, processes starting and stopping, etc. Some embodiments configure these guest introspection agents to report such events to the context engine 505 through the multiplexer 525.

The context engine 515 of some embodiments executes within the virtualization software (e.g., the hypervisor) of the host machine 500, and includes a context core 530, a set of context clients 535 that includes the data collection agent 505, and communication channels 540 and 545 with the network manager agent and the data collection appliance, respectively. The context engine 515 of some embodiments discovers and collects guest DCN context (e.g., network connections, file operations, operating system information, etc.) in real time. The context core 530 is responsible for receiving data sent to the context engine and distributing that data to various context clients. These clients can include an application discovery module for discovering applications running in the DCNs, a firewall module, etc., in addition to the data collection agent 505.

Figure 6:
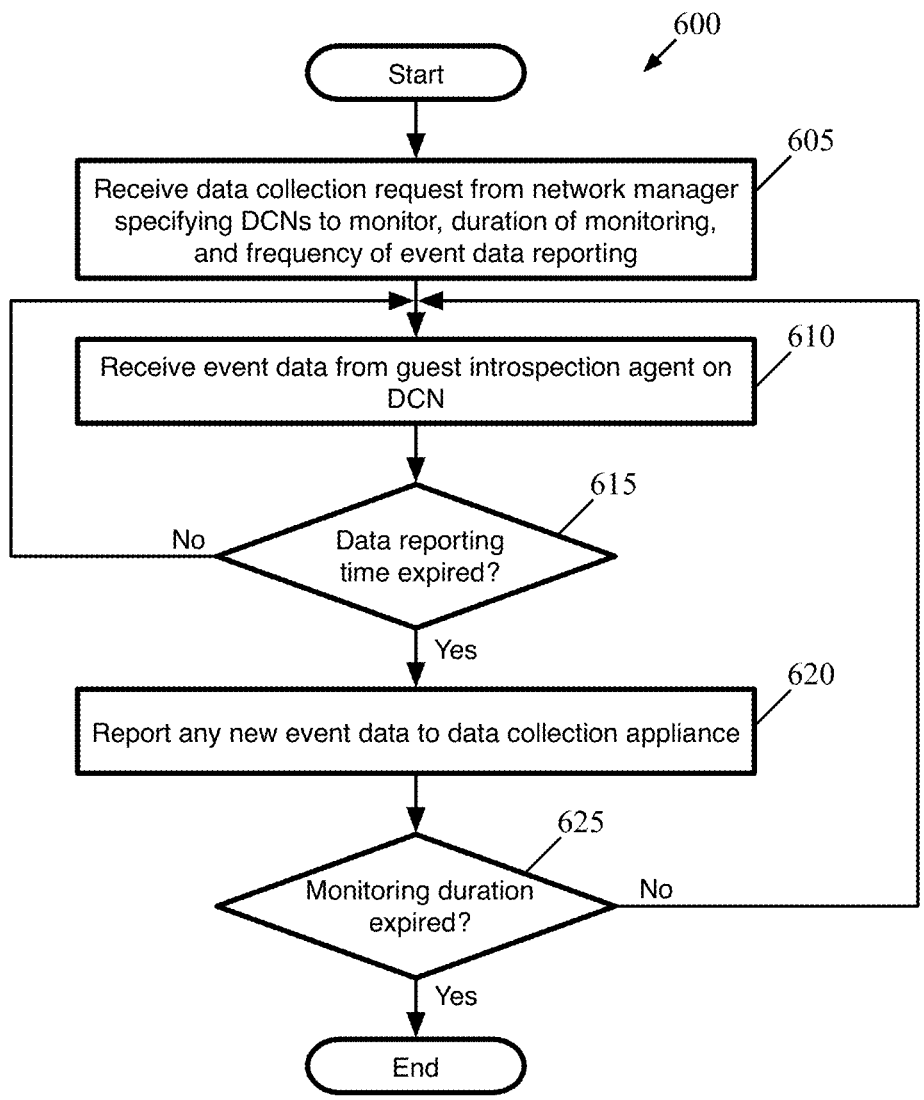
FIG. 6 conceptually illustrates a process of some embodiments for receiving event data from DCNs on a host machine and reporting that event data to the data collection appliance.

The operation of the data collection agent 505 will be described by reference to FIG. 6, which conceptually illustrates a process 600 of some embodiments for receiving event data from DCNs on a host machine and reporting that event data to the data collection appliance. In some embodiments, the process 600 is performed by a data collection agent operating in the context engine of a host machine.

As shown, the process 600 begins by receiving (at 605) a data collection request from a network manager agent specifying one or more DCNs (e.g., VMs) to monitor. In some embodiments, this request specifies the DCNs (that operate on the host machine) to monitor, an identifier for the monitoring session, the duration for which to monitor the DCNs, and a frequency with which to report updates to the data collection appliance. Some embodiments also specify the particular data collection appliance to which to report these updates, while in other embodiments the data collection agent is previously configured with this information. In some embodiments, the data collection agent 505 receives the request through the channel 540 with the network manager agent (e.g., an RMQ channel).

The process 600 then receives (at 610) event data from the guest introspection agent(s) executing in the monitored DCNs. In some embodiments, the guest introspection agents 520 in all of the DCNs automatically report all of the events (including network events) to the context engine 515, while in other embodiments the data collection agent 505 or another module configures the guest introspection agent 520 of a particular DCN to report the event data only after the command to monitor that particular DCN is received. In the former case, either the context core 530 only provides the data collection agent 505 with events for monitored DCNs, while in other embodiments the data collection agent 505 receives all of the events and discards events from DCNs not currently being monitored.

As described above, these events can include network events, such as (i) a process (acting as a client) on the DCN issuing an outbound connection request (to a server), (ii) a process on the DCN issuing a disconnection request, (iii) a process (as a server) on the DCN receiving an incoming connection request from a client, (iv) a process on the DCN initiating a disconnect of an existing connection, (v) a process (acting as a server) on the DCN starting to listen on a socket, and (vi) a process (acting as a server) DCN stopping listening on a socket. Each of these network events, in some embodiments, is reported with data indicating the DCN on which the event occurred, process name to which the event relates, the source and/or destination IP addresses for any connections, the source and/or destination transport layer ports of such connections, and transport protocol for these connections. Other events may be received by the data collection agent as well, such as processes starting up or shutting down on the DCN.

The process 600 also determines (at 615) whether the data reporting time has expired. As noted, each monitoring command from the network manager agent specifies a data reporting frequency in some embodiments. If this time has not expired since the last data report to the data collection appliance, the process continues to receive event data at 610. It should be understood that the illustrated process 600 is a conceptual process, and that some embodiments do not repeatedly perform the check 615. Rather, the data collection agent receives event data until a timer expires.

Once the data reporting time has expired, the process 600 reports (at 620) any new event data to the data collection appliance. As described above, in some embodiments, each reported event includes at least the connection information (if a network event), the DCN on which the event occurred, the process associated with the event. When a host machine includes multiple DCNs that are part of the same monitoring session, some embodiments group the events by DCN. In addition, before reporting, the data collection agent 505 deduplicates the event data. If one process on a DCN initiates multiple transport layer connections (e.g., TCP connections) to the same IP address and port within one reporting timeframe, some embodiments treat these as duplicates, and only report a single event.

The process 600 then determines (at 625) whether the monitoring duration has expired. The monitoring duration may be set by the administrator that initiates the application monitoring or may be a preconfigured duration for the system (e.g., 5 minutes). If this time has expired, the process ends. Otherwise, the process returns to 610 to continue receiving data until the next data report (and resets the data reporting time).

It should be understood that the architecture diagrams of FIGS. 1, 2, and 5 may not illustrate all modules in their respective systems, and in other embodiments other modules or different modules may be present, and/or some modules shown may not be present. For example, in the system 100 the data processor 140 and data collection manager 135 may be completely separate (and even execute on different machines) rather than being part of the same appliance. In the data collection appliance 200, the data collection manager 205 could include a module for interacting with other aspects of a larger application that includes the data collection appliance. Similarly, the context engine 515 of some embodiments could include a specific security module for handling data from the guest introspection agents 520.

As noted above, FIG. 7 illustrates an application topology graph 700, along with an application statistics table 705. The data collection appliance of some embodiments generates these visualizations and provides them to the client in order to be incorporated into the client user interface. Such a UI can also include other graphs (e.g., graphs of resource usage over time by the various processes) or other data visualizations about a monitored distributed application in some embodiments.

As shown, the application topology graph 700 illustrates various components of the distributed application, including a web server 710, an edge load balancer 715, two application servers 720 and 725, and a database server 730. Each component 710-730 is shown with the process name (nginx.exe for the web server, tomcat7.exe for the application servers, and postgres.exe for the database server), the name of the DCN on which the process executes (e.g., Web Server, AppServer1, AppServer2, etc.), and all of its relevant IP addresses (the web server has both an external-facing IP address used by clients as well as an internal-facing IP address on the logical network, while the load balancer also has IP addresses on both the web server subnet as well as the application server subnet). In addition, some embodiments illustrate the clients interacting with this distributed application, which in this case is a single client with IP address 10.2.126.18. If multiple clients are contacting the distributed application, some embodiments show all of the clients (though for very popular applications this may be too difficult). Some embodiments additionally provide information regarding the operating system, type of machine, etc. of the client if this information is available with the event data.

The application topology graph 700 also displays the number of transport layer connections between each of the components of the application (e.g., 27 between the load balancer 715 and the first application server 720) as well as the average latency between the components. As described above, this data can be extracted and calculated by the data collection appliance of some embodiments based on the event data received from the computers.

Some embodiments provide other information on the graph 700 as well, that is not shown in this figure. For example, some embodiments display (or provide the option to display) the processing load on the various components, or at least the application servers. If a process has stopped working, the process may be highlighted on the application topology graph or a warning displayed to indicate the issue. Furthermore, the connection lines can be drawn as dashed in this case to indicate that the connection is no longer available. Other features may include having the connection lines pulse as additional connections are detected.

Some embodiments also display the logical network information on the topology graph 700 or as a separate display within the UI. In this example, the web server is connected to a first logical switch, the two application servers are connected to a second logical switch, and the database server is connected to a third logical switch. The edge load balancer is a component of a logical router to which at least the first and second logical switches connect. The third logical switch may also connect to this logical router or could connect to a second logical router with a connection to the first logical router.

The table 705 provides various network resource usage statistics about some of the components of the distributed application. Specifically, this table 705 provides information for the virtual server (represented by the load balancer), the overall application server pool, and the breakdown between the two application servers in the pool. This information includes the status of each component, the IP address, the amount of data sent in and out, the number of HTTP requests, the total number of sessions, and the number of current sessions (0 in this case). Other embodiments may include additional data (e.g., data for the database server, etc.).

Figure 8:
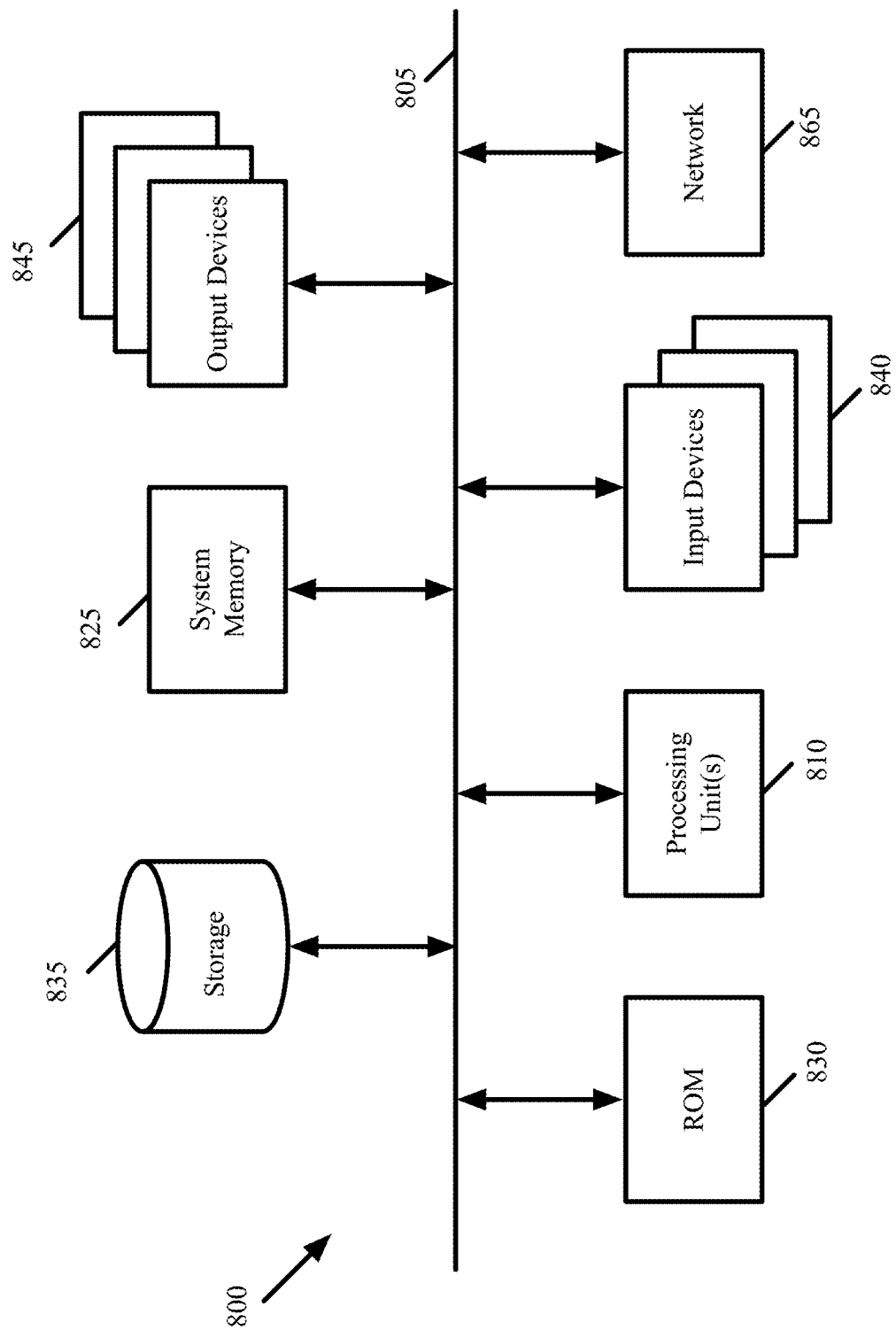
FIG. 8 conceptually illustrates an electronic system with which some embodiments of the invention are implemented.

FIG. 8 conceptually illustrates an electronic system 800 with which some embodiments of the invention are implemented. The electronic system 800 can be used to execute any of the control, virtualization, or operating system applications described above. The electronic system 800 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 825, and the permanent storage device 835.

From these various memory units, the processing unit(s) 810 retrieve instructions to execute and data to process in order to execute the processes of the invention. The processing unit(s) may be a single processor or a multi-core processor in different embodiments.

The read-only-memory (ROM) 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 825 is a read-and-write memory device. However, unlike storage device 835, the system memory is a volatile read-and-write memory, such a random-access memory. The system memory stores some of the instructions and data that the processor needs at runtime. In some embodiments, the invention's processes are stored in the system memory 825, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices enable the user to communicate information and select commands to the electronic system. The input devices 840 include alphanumeric keyboards and pointing devices (also called "cursor control devices"). The output devices 845 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 8, bus 805 also couples electronic system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 3, 4, and 6) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for monitoring a distributed application comprising a plurality of components exchanging data messages within a network, the method comprising:
   receiving, through a user interface (UI), a request to perform data collection for the distributed application;
   identifying a set of data compute node (DCN) groups, each DCN group associated with a different component of the distributed application;
   providing, to a network manager server, identifiers for each of the DCN groups in the identified set of DCN groups along with a request to collect event data associated with DCNs of the identified set of DCN groups, wherein the network manager server sends commands to a plurality of host machines that execute the DCNs in the identified DCN groups to detect events related to the DCNs;
   receiving, from the plurality of host machines, data regarding the detected events related to the DCNs; and
   from the received data regarding the detected events, generating a UI presentation that displays a logical network topology of the distributed application and a set of one or more problems with the distributed application for a network administrator to review, said generating using network addresses of the DCNs to map different processes of the distributed application to logical ports of logical forwarding elements in logical network topology data received from the network manager server.

2. The method of claim 1, wherein receiving the request to perform data collection comprises receiving a request from a user to troubleshoot the distributed application.

3. The method of claim 1, wherein the set of DCN groups comprises a group of web server DCNs, a group of application server DCNs, and a group of database server DCNs.

4. The method of claim 1, wherein data collection agents operate on each of the host machines in the plurality of host machines to detect events and report the detected events.

5. The method of claim 4, wherein a data collection agent on a particular host machine is configured to detect events for one or more DCNs of the identified DCN groups that operate on the particular host machine for a particular period of time and to provide data regarding the detected events at a particular frequency.

6. The method of claim 4, wherein the data collection agents execute within virtualization software of the respective host machines.

7. The method of claim 1, wherein the detected events comprise network events and processes starting and stopping on the DCNs.

8. The method of claim 7, wherein the network events comprise process identification data specifying a process that initiated or received a network event.

9. The method of claim 7, wherein the network events comprise initiation and completion of transport layer connections.

10. The method of claim 1, wherein generating the UI presentation that displays the topology of the distributed application and the set of one or more problems with the distributed application comprises:
    correlating network events from source DCNs with network events from destination DCNs to identify connections between DCNs in the groups of DCNs; and
    using the connections between DCNs and the network topology data from the network manager server to construct an application topology graph that identifies the different processes of the distributed application and connections between these processes.

11. The method of claim 1, wherein the groups of DCNs comprise virtual machines (VMs).

12. The method of claim 1, wherein a user interacts with the data collection appliance via a client application, the method further comprising providing the generated UI presentation that displays the distributed application topology and the set of one or more problems with the distributed application to the client application.

13. A non-transitory machine-readable medium storing a program which when executed by at least one processing unit monitors a distributed application, the program comprising sets of instructions for:

receiving, through a user interface (UI), a request to perform data collection for the distributed application;

identifying a set of data compute nodes (DCNs) groups, each DCN group associated with a different component of the distributed application;

providing, to a network manager server, identifiers for each of the DCN groups in the identified set of DCN groups along with a request to collect event data associated with DCNs of the identified set of DCN groups, wherein the network manager server sends commands to a plurality of host machines that execute the DCNs in the identified DCN groups to detect events related to the DCNs;

receiving, from the plurality of host machines, data regarding the detected events related to the DCNs; and from the received data regarding the detected events, generating a UI presentation that displays a logical network topology of the distributed application and a set of one or more problems with the distributed application for a network administrator to review, said generating using network addresses of the DCNs to map processes of the distributed application to logical ports of logical forwarding elements in logical network topology data received from the network manager server.

14. The non-transitory machine-readable medium of claim 13, wherein data collection agents operate on each of the host machines in the plurality of host machines to detect events and report the detected events, wherein a data collection agent on a particular host machine in the plurality of host machines is configured to detect events for one or more DCNs of the identified DCN groups that operate on the particular host machine for a particular period of time and to provide data regarding the detected events at a particular frequency.

15. The non-transitory machine-readable medium of claim 14, wherein the data collection agents collect at least a subset of the data regarding the detected events from guest introspection agents executing on the DCNs of the identified DCN groups.

16. The non-transitory machine-readable medium of claim 13, wherein the set of instructions for generating the UI presentation that displays the topology of the distributed application and the set of one or more problems with the distributed application comprises sets of instructions for:

correlating network events from source DCNs with network events from destination DCNs to identify connections between DCNs in the groups of DCNs;

using the connections between DCNs and the network topology data from the network manager server to construct an application topology graph that identifies the different processes of the distributed application and connections between these processes.

17. The non-transitory machine-readable medium of claim 13, wherein a user interacts with the data collection appliance via a client application, the program further comprising a set of instructions for providing the generated UI presentation that displays the distributed application topology to the client application.

18. The non-transitory machine-readable medium of claim 13, wherein the set of DCN groups comprises a group of web server DCNs, a group of application server DCNs, and a group of database server DCNs.

19. The method of claim 1, wherein:

the DCNs are virtual machines (VMs);

data collection agents execute on each of the host machines, outside of the VMs, to detect the events and report the data regarding the detected events; and guest introspection agents execute on each of the VMs to collect at least a subset of the data regarding the detected events and provide the collected data to the data collection agents on the respective host machines via context engines on the respective host machines.

20. The method of claim 19, wherein the subset of data regarding the detected events provided to the data collection agents by the guest introspection agents via the context engines comprises context data regarding operation of the DCNs.

21. The method of claim 1, wherein the set of one or more problems displayed in the generated UI presentation comprises a warning that a process executing in one of the DCNs has stopped working.

* * * * *